US011373667B2

(12) United States Patent
Kaskari et al.

(10) Patent No.: US 11,373,667 B2
(45) Date of Patent: Jun. 28, 2022

(54) REAL-TIME SINGLE-CHANNEL SPEECH ENHANCEMENT IN NOISY AND TIME-VARYING ENVIRONMENTS

(71) Applicant: SYNAPTICS INCORPORATED, San Jose, CA (US)

(72) Inventors: Saeed Mosayyebpour Kaskari, Irvine, CA (US); Francesco Nesta, Aliso Viejo, CA (US); Trausti Thormundsson, Irvine, CA (US); Thomas Aaron Gulliver, Victoria (CA)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/957,829

(22) Filed: Apr. 19, 2018

(65) Prior Publication Data

US 2018/0308503 A1 Oct. 25, 2018

Related U.S. Application Data

(60) Provisional application No. 62/487,449, filed on Apr. 19, 2017.

(51) Int. Cl.
*H04B 15/00* (2006.01)
*G10L 21/0232* (2013.01)
(Continued)

(52) U.S. Cl.
CPC ........ *G10L 21/0232* (2013.01); *G10L 21/038* (2013.01); *G10L 25/18* (2013.01); *G10L 2021/02082* (2013.01)

(58) Field of Classification Search
CPC ......... G10L 2021/02166; G10L 19/008; G10L 21/0208; G10L 2021/02082; G10L 19/26;
(Continued)

(56) References Cited

U.S. PATENT DOCUMENTS 6,324,502 B1 * 11/2001 Handel ............... G10L 21/0208 704/226
6,487,257 B1 * 11/2002 Gustafsson ......... G10L 21/0208 375/285

(Continued)

OTHER PUBLICATIONS

Gerkmann et al., "Unbiased MMSE-Based Noise Power Estimation with Low Complexity and Low Tracking Delay," IEEE Transactions on Audio, Speech, and Language Processing, Dec. 21, 2011, pp. 1383-1393, vol. 20, Issue 4, IEEE.

(Continued)

*Primary Examiner* — Kharye Pope
(74) *Attorney, Agent, or Firm* — Paradice & Li LLP

(57) ABSTRACT

Systems and methods for processing an audio signal include an audio input operable to receive an input signal comprising a time-domain, single-channel audio signal, a subband analysis block operable to transform the input signal to a frequency domain input signal comprising a plurality of k-spaced under-sampled subband signals, a reverberation reduction block operable to reduce reverberation effect, including late reverberation, in the plurality of k-spaced under-sampled subband signals, a noise reduction block operable to reduce background noise from the plurality of k-spaced under-sampled subband signals, and a subband synthesis block operable to transform the subband signals to the time-domain, thereby producing an enhanced output signal.

20 Claims, 6 Drawing Sheets

(51) Int. Cl.

| | |
|---|---|
| ***G10L 21/038*** | (2013.01) |
| ***G10L 21/0208*** | (2013.01) |
| ***G10L 25/18*** | (2013.01) |
| *G10L 21/00* | (2013.01) |

(58) Field of Classification Search

CPC ............... G10L 21/038; G10L 21/0232; G10L 19/0204; G10L 19/025; G10L 21/02; G10L 21/0216; G10L 25/18; G10L 21/0224; G10K 11/16; G10K 2210/3028

USPC ................ 381/66, 63, 94.1, 71.1, 94.3, 317; 704/500, 205, 226, E21, E21.004, E19.01, 704/E19.018; 379/406.03

See application file for complete search history.

(56) References Cited

U.S. PATENT DOCUMENTS

| | | | | |
|---|---|---|---|---|
| 9,558,757 | B1 * | 1/2017 | Li | G10L 21/0208 |
| 2005/0240401 | A1 * | 10/2005 | Ebenezer | G10L 21/0208 704/226 |
| 2006/0222172 | A1 * | 10/2006 | Chhetri | H04M 9/082 379/406.05 |
| 2008/0069366 | A1 * | 3/2008 | Soulodre | H04S 7/301 381/63 |
| 2008/0292108 | A1 * | 11/2008 | Buck | H04R 3/04 381/63 |
| 2009/0117948 | A1 * | 5/2009 | Buck | 455/570 |
| 2009/0248403 | A1 * | 10/2009 | Kinoshita | H04N 7/147 704/219 |
| 2010/0316228 | A1 * | 12/2010 | Baran | H04M 9/082 381/66 |
| 2011/0079720 | A1 * | 4/2011 | Heidari | G01J 3/28 250/340 |
| 2012/0263311 | A1 * | 10/2012 | Neugebauer | G10K 15/12 381/63 |
| 2013/0230184 | A1 * | 9/2013 | Kuech | H04M 9/085 381/66 |
| 2014/0270216 | A1 * | 9/2014 | Tsilfidis | H04M 9/082 381/66 |
| 2015/0016622 | A1 * | 1/2015 | Togami | H04R 3/02 381/66 |
| 2015/0189436 | A1 * | 7/2015 | Kelloniemi | H04S 7/30 381/98 |
| 2015/0256956 | A1 * | 9/2015 | Jensen | H04R 25/30 381/56 |
| 2016/0029120 | A1 * | 1/2016 | Nesta | H04M 9/082 381/66 |
| 2016/0035367 | A1 * | 2/2016 | Goesnar | G10L 21/0208 704/228 |
| 2017/0133034 | A1 * | 5/2017 | Uhle | G10L 19/008 |
| 2018/0040333 | A1 * | 2/2018 | Wung | G10L 21/0232 |
| 2018/0075862 | A1 * | 3/2018 | Shi | G10L 21/0208 |
| 2018/0240471 | A1 * | 8/2018 | Markovich Golan | G10L 21/0232 |
| 2018/0277137 | A1 * | 9/2018 | Elko | H04R 1/406 |
| 2019/0080709 | A1 * | 3/2019 | Wolff | G01H 7/00 |

OTHER PUBLICATIONS

Habets, E.A.P., "Single- and Multi-Microphone Speech Dereverberation using Spectral Enhancement," 2007, 20 Pages, Eindhoven Univ. of Technol., Eindhoven, The Netherlands.

Keshavarz et al., "Speech-Model Based Accurate Blind Reverberation Time Estimation Using an LPC Filter," IEEE Transactions on Audio, Speech, and Language Processing, Aug. 2012, pp. 1884-1893, vol. 20, No. 6, IEEE.

Loizou, Philipos C., Speech Enhancement: Theory and Practice, Second Edition, 2013, 705 Pages, CRC Press, Boca Raton, FL.

Martin, Rainer, "Noise Power Spectral Density Estimation Based on Optimal Smoothing and Minimum Statistics," IEEE Transactions on Speech and Audio Processing, Jul. 2001, pp. 504-512, vol. 9, No. 5, IEEE.

Martin, Rainer, "Bias Compensation Methods for Minimum Statistics Noise Power Spectral Density Estimation," Signal Processing, Jun. 2006, pp. 1215-1229, vol. 86, No. 6.

Mauler et al., "Noise Power Spectral Density Estimation on Highly Correlated Data," Proc. Int. Workshop Acoustic. Echo Noise Control, Sep. 12-14, 2006, pp. 1-4.

Mosayyebpour et al., "Single-Microphone Early and Late Reverberation Suppression in Noisy Speech," IEEE Transactions on Audio, Speech, and Language Processing, Feb. 2013, pp. 322-335, vol. 21, No. 2.

Mosayyebpour et al., "Single-Microphone LP Residual Skewness-Based for Inverse Filtering of the Room Impulse Response," IEEE Transactions on Audio, Speech, and Language Processing, Jul. 2012, pp. 1617-1632, vol. 20, No. 5.

Mosayyebpour et al., "Single Channel Inverse Filtering of Room Impulse Response by Maximizing Skewness of LP Residual," 2010 International Conference on Signal Acquisition and Processing, Feb. 2010, pp. 130-134.

Gerkmann and Hendriks, "Noise Power Estimation Based on the Probability of Speech Presence," 2011 IEEEWorkshop on Applications of Signal Processing to Audio and Acoustics, Oct. 16-19, 2011, New Paltz, NY, pp. 145-148.

* cited by examiner

REAL-TIME SINGLE-CHANNEL SPEECH ENHANCEMENT IN NOISY AND TIME-VARYING ENVIRONMENTS

CROSS-REFERENCE TO RELATED APPLICATIONS

This application claims the benefit of and priority to U.S. Provisional Patent Application No. 62/487,449, filed Apr. 19, 2017, and entitled "REAL-TIME SINGLE-CHANNEL SPEECH ENHANCEMENT IN NOISY AND TIME-VARYING ENVIRONMENTS," which is incorporated herein by reference in its entirety.

TECHNICAL FIELD

The present disclosure relates generally to audio processing, and more specifically to dereverberation of single-channel audio signals.

BACKGROUND

Reverberation reduction solutions are known in the field of audio signal processing. However, many conventional approaches are not suitable for use in real-time applications. For example, a reverberation reduction solution may include a long buffer of data to compensate for the effect of reverberation or to estimate an inverse filter of the Room Impulse Responses (RIR). Approaches that are suitable for real-time applications do not perform reasonably well in high reverberation and especially high non-stationary environments. In addition, such solutions require a large amount of memory and are not computationally efficient for many low power devices.

The performance of single-microphone reverberation reduction algorithms tend to deteriorate in noisy environments. Single-microphone reverberation reduction solutions may require considerable amount of speech data to train the system for an environment in practice, preventing utilization in real-environment where the reverberation is time-varying due to speaker movements (e.g., movement in a room). Some single-microphone reverberation reduction algorithms take the presence of noise into account, and employ spectral subtraction for noise reduction. However, further reverberation time estimation in noisy conditions is often needed for acceptable noise reduction.

One conventional solution is based on weighted prediction error (WPE), which assumes an autoregressive model of the reverberation process, i.e., it is assumed that the reverberant component at a certain time can be predicted from previous samples of reverberant microphone signals. The desired signal can be estimated as the prediction error of the model. A fixed delay is introduced to avoid distortion of the short-time correlation of the speech signal. This algorithm is not suitable for real-time processing and time-varying environments. Attempts to modify WPE for time-varying environments include both WPE for linear filtering and an optimum combination of the beamforming and a Wiener-filtering-based nonlinear filtering. However, such proposals are still not real-time and are not suitable for use in low power devices because of its high complexity.

Many traditional approaches to speech enhancement are not applicable for real-time applications such as hearing aids and mobile devices because of severe hardware and psychoacoustics constraints such as ≤10 millisecond latency between input and output (1/10th the time of a blink of an eye) due to bone conduction acoustic feedback, ≤40 MIPs CPU processing requirements (1/100th of the processing power of a smartphone) due to battery life constraints, and ≤100 Kilobyte algorithm memory requirements (1 millionth of the memory of a current generation smartphone) due to target device memory constraints.

Generally, conventional methods have limitations in complexity and practicality for use in online and real-time applications. Unlike batch processing, real-time or online processing is widely used and desirable in industry for many practical applications. There is therefore a need for improved systems and methods for online and real-time dereverberation.

SUMMARY

In the present disclosure, various embodiments of systems and methods for real-time, dereverberation of single-channel audio signals are provided. In various embodiments, a method for processing an audio signal includes receiving an input signal including a time-domain, single-channel audio signal, transforming the input signal to a frequency domain input signal including a plurality of k-spaced under-sampled subband signals, reducing reverberation effect, including late reverberation, in the plurality of k-spaced under-sampled subband signals, reducing background noise from the plurality of k-spaced under-sampled subband signals, and transforming the subband signals to the time-domain, thereby producing an enhanced output signal.

In some embodiments, reducing the reverberation effect further includes using spectral subtraction including buffering $L_k$ frames of the plurality of k-spaced under-sampled subband signals, estimating a short time magnitude spectral density (STMSD) of the late reverberation for a current frame, averaging the STMSD over the $L_k$ frames, and nonlinearly filtering the plurality of k-spaced under-sampled subband signals. The method may further include buffering, in a real-value buffer, for each frequency bin a magnitude of spectral density of the input signal for a previous $L_k$ frames, and wherein the estimating the STMSD includes accessing the real-value buffer to estimate the STMSD of the late reverberation. In some embodiments, estimating the STMSD of the late reverberation further includes using a prediction filter and storing the estimated STMSD in a buffer, wherein averaging the STMSD over the $L_k$ frames includes computing the average of the estimated STMSD stored in the buffer.

In some embodiments, the method further includes storing STMSD values of late reverberation for previous $T_k$ frames in a buffer, estimating spectral gain for reverberation reduction using Signal To Reverberation Ratio (SRR) and spectral gain floor to reduce distortion in the enhanced output signal, and applying the estimated spectral gain to reduce the reverberation effect.

In some embodiments, reducing background noise from the plurality of k-spaced under-sampled subband signals further includes using spectral subtraction which includes estimating short time power spectral density (STPSD) of noise, estimating spectral gain and nonlinearly filtering the subband signals. The method may further include estimating spectral gain for noise reduction using SRR and spectral gain floor to reduce distortion in the enhanced output signal, and applying noise-reduction spectral gain to reduce background noise, and wherein estimating the STPSD further includes estimating in real time the STPSD of noise.

In various embodiments, a system for processing an audio signal includes an audio input operable to receive an input signal including a time-domain, single-channel audio signal, a subband analysis block operable to transform the input signal to a frequency domain input signal including a plurality of k-spaced under-sampled subband signals, a reverberation reduction block operable to reduce reverberation effect, including late reverberation, in the plurality of k-spaced under-sampled subband signals, a noise reduction block operable to reduce background noise from the plurality of k-spaced under-sampled subband signals, and a subband synthesis block operable to transform the subband signals to the time-domain, thereby producing an enhanced output signal.

In some embodiments, the reverberation reduction block is further operable to use spectral subtraction which includes buffering $L_k$ frames of the plurality of k-spaced under-sampled subband signals, estimating a short time magnitude spectral density (STMSD) of the late reverberation for a current frame, averaging the STMSD over the $L_k$ frames, and nonlinearly filtering the k-spaced under-sampled subband signals. The system may further include a real-value buffer storing for each frequency bin a magnitude of spectral density of the input signal for a previous $L_k$ frames, and wherein estimating the STMSD includes accessing the real-value buffer to estimate the STMSD of the late reverberation. In some embodiments, estimating the STMSD of the late reverberation further includes using a prediction filter and storing the estimated STMSD in a buffer, wherein averaging the STMSD over the $L_k$ frames includes computing an average of the STMSD stored in the buffer.

In some embodiments, the system is further operable to store values of STMSD of late reverberation for previous $T_k$ frames in a buffer, and estimate spectral gain for reverberation reduction using Signal To Reverberation Ratio (SRR) and spectral gain floor to reduce distortion in the enhanced output signal, and apply the estimated spectral gain to reduce the reverberation effect.

In some embodiments, reducing background noise from the plurality of k-spaced under-sampled subband signals further includes using spectral subtraction which includes estimating short time power spectral density (STPSD) of noise, estimating spectral gain and nonlinearly filtering the k-spaced under-sampled subband signals. The system may also be operable to estimate spectral gain for noise reduction using SRR and spectral gain floor to reduce distortion in the enhanced output signal, and apply noise-reduction spectral gain to reduce background noise, and wherein the STPSD further includes estimating in real time the STPSD of noise.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

In accordance with various embodiments of the present disclosure, systems and methods for real-time, dereverberation of single-channel audio signals are provided.

Figure 1:
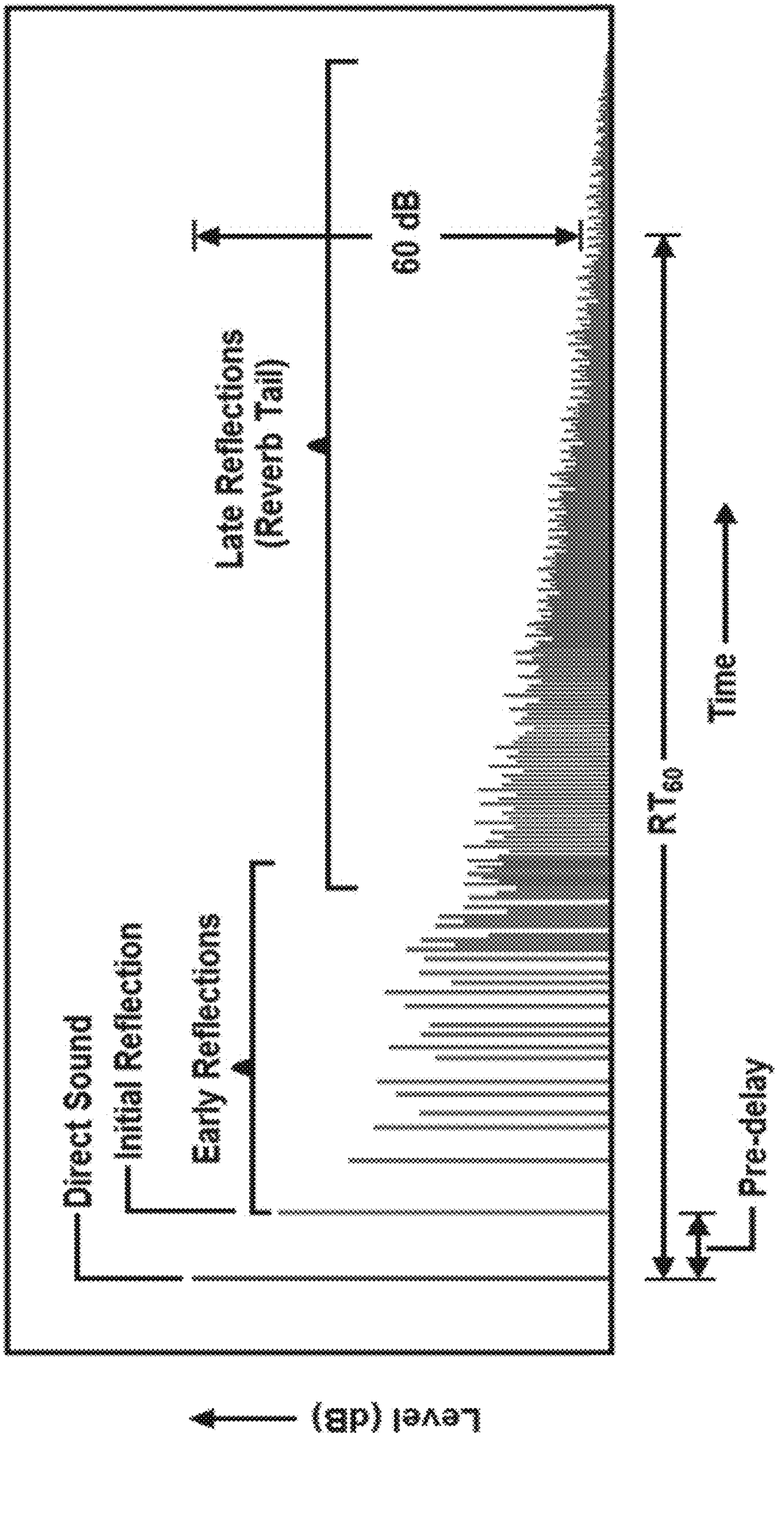
FIG. 1 illustrates an embodiment of a room impulse response.

A speech signal recorded by one microphone typically contains both noise and reverberation. An example of Room Impulse Response (RIR) is shown in FIG. 1 where the main components of reverberation includes direct path, early reflections which is the initial part of the RIR (mostly the first 50 ms), and the late reflections. The figure also shows RT60 (reverberation time). The main cause of severe degradation in many applications including Automatic Speech Recognition (ASR) is the late reverberation. In this work, a new algorithm is proposed to effectively estimate the effect of late reverberation in frequency domain, namely Short Time Power Spectral Density (STPSD) and then a nonlinear filter is built based on this estimation to reduce the late reverberation. The algorithm is robust in time-varying environments and so it can be used for many applications including Voice over Internet Protocol (VoIP). Then a single-channel noise reduction is proposed to reduce the effect of background noise.

Online adaptive algorithms are known in the art for online, real-time processing, such as a Recursive Least Squares (RLS) method to develop the adaptive WPE approach or a Kalman filter approach where a multi-microphone algorithm that simultaneously estimates the clean speech signal and the time-varying acoustic system is used. The recursive expectation-maximization scheme is employed to obtain both the clean speech signal and the acoustic system in an online manner. However, both in the RLS-based and Kalman filter based algorithms, the methods do not perform well in highly non-stationary conditions. In addition, the computational complexity and memory usage for both Kalman and RLS algorithms is unreasonably high for many applications. Plus, despite their fast convergence to the stable solution, the algorithms may be too sensitive to sudden changes and require a change detector to reset the correlation matrices and filters to their initial values. As a result, these online methods do not perform well in highly time-varying environments when the RIR is changing over time (e.g., due to movement of a speaker).

When multiple microphones are available, spatial processing can be used to improve the performance of speech enhancement techniques. However many speech communication systems are equipped with only a single microphone. In addition for many applications such as hearing aids or hands-free teleconferencing, the speech enhancement should be performed in real-time. As a consequence, the blind joint suppression of background noise and reverberation effects using only one-microphone for real-time processing is of great importance and it is a very challenging yet significant problem.

The present disclosure includes a novel, blind, single-microphone speech dereverberation algorithm that can address many of the limitations of conventional approaches. Various embodiments disclosed herein include reduction reverberation reduction approaches that effectively reduce reverberation. In various embodiments, a noise reduction approach is also presented to reduce the background noise. It will be appreciated, however, that the proposed reverberation reduction algorithm may be used along with other noise reduction algorithms.

In real environments, the recorded speech signal is typically noisy and this noise can degrade the speech intelligibility for voice applications, such as a VoIP application, and it can decrease the performance of speech recognition performance of devices such as phones and laptops. When microphone arrays instead of a single microphone are employed, it is easier to solve the problem of interference noise using beamforming algorithms or other approaches which can exploit the spatial diversity to better detect or extract desired source signals and to suppress unwanted interference. Beamforming represents a class of such multichannel signal processing algorithms including spatial filtering which points a beam of increased sensitivity to desired source locations while suppressing signals originating from all other locations. When multiple microphones are available, spatial processing can be used to improve the performance of speech enhancement techniques. However many speech communication systems are equipped with only a single microphone.

The noise suppression may be sufficient in implementation where the signal source is close to the microphones (near-field scenario). However the problem can be more severe when the distance between source and microphones is increased. Let's look at the following figure.

Figure 2:
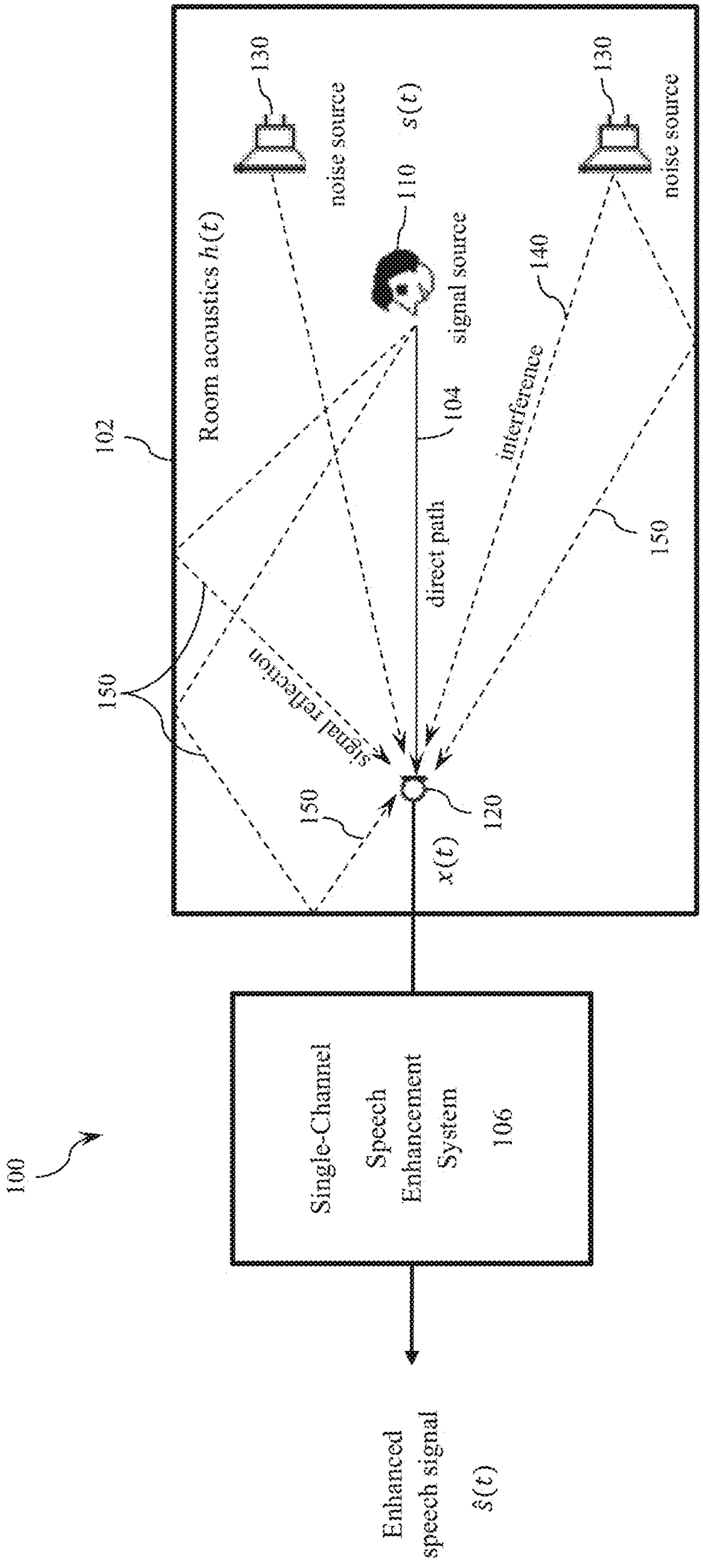
FIG. 2 is a block diagram of a speech dereverberation system in accordance with an embodiment of the present invention.

FIG. 2 illustrates a speech dereverberation system 100, including a single channel speech enhancement system 106, in accordance with an embodiment of the present invention. A signal source 110, such as a human speaker, is located a distance away from a microphone 120 in an environment 102, such as a room. The microphone 120 collects a desired signal 104 received in a direct path between the signal source 110 and the microphone 120. The microphone 120 also collects noise from noise sources 130, including noise interference 140 and signal reflections 150 off of walls, the ceiling and/or other objects in the environment 102. In operation, a typical observed speech signal in an enclosed environment contains reverberation. The received speech signal $x(t)$ can be modeled by convolution of source sound ($s(t)$) and the room acoustic ($h(t)$), i.e. $x(t)=s(t)*h(t)$. A goal of the present embodiment is to obtain an estimation of the source ($\hat{s}(t)$).

In this embodiment, the source signal is far from the microphone and the signal collected by the microphone includes not only the direct path but also the signal reflections off the walls, ceiling and other objects, as well as other noise source signals which are around the signal source. The quality of a VoIP call and the performance of many applications that include sound source localization and ASR are sensibly degraded in these reverberant environments because reverberation blurs the temporal and spectral characteristics of the direct sound. Speech enhancement in a noisy reverberant environment is a difficult problem because (i) speech signals are colored and nonstationary, (ii) noise signals can change dramatically over time, and (iii) the impulse response of an acoustic channel is usually very long and has nonminimum phase. A goal of the present embodiment is to build a noise robust single-channel speech dereverberation system, e.g., single-channel speech enhancement system 106 as shown in FIG. 2, to reduce the effect of reverberation.

Conventional methods for dealing with this problem are typically restricted for use in a specific application and some other methods aim to reduce reverberation and noise through a preprocessing step. Conventional single-microphone methods for dealing with the problem of reverberation have several limitations that make them not to be useful in many applications in industry. For example, high computational complexity and memory consumption may cause conventional algorithms to be impractical for many real-world, embedded, use cases and eliminate the possibility of real-time, "online" processing. Such conventional approaches also fail to explicitly consider nonstationary noise in the model, which can greatly deteriorate the performance of dereverberation when the reverberant speech signals are contaminated with nonstationary additive background noise. Many conventional single-microphone dereverberation methods use batch approaches and require a considerable amount of input data to produce a good performance, which are not acceptable for applications such as VoIP and hearing aids where latency is not desirable. Finally, most conventional single-microphone dereverberation methods cannot work under time-varying conditions. Most of the current dereverberation methods require some knowledge of the RIR or its properties such as reverberation time. This is often difficult to estimate and this can decrease the performance of the methods. Thus, if there is a sudden change in the RIR, performance of the methods would be greatly affected.

The solutions proposed herein address all the above limitations which is desirable for different applications in industry. More importantly the embodiments described are designed to be robust to any changes in the RIR with no latency, which makes it desirable for applications like VOIP. In one embodiment, a subband-domain single-channel linear prediction filter is used. In this embodiment, the prediction filter is assumed to be fixed, having the exponentially decaying function, but nonlinear filtering is employed using Signal To Reverberation Ratio (SRR)-based spectral gain. One advantage of this embodiment is that it is blind and requires no knowledge about the source and the channel such as the reverberation time. In addition, the method is computationally efficient and it requires low memory which is desirable for small devices. Additive background noise is also considered and can be reduced by adaptively estimating the Power Spectral Density (PSD) of the noise.

An embodiment of the present invention will be described with reference to the structural block diagram of FIG. 3. As illustrated, a single-channel noise reduction system 200 includes a subband decomposition module 210, a buffer 220, reverberation reduction block 230, noise reduction module 260, and synthesis module 270.

The subband decomposition module 210 receives a time-domain input signal, $x[n]$, from a microphone at input 202 and performs subband analysis, transforming the time domain signal into a sequence of frequency domain subband frames denoted by $X(l,k)$, where $l$ is the frame index and $k=1 \ldots K$ is the frequency index with $K$ bands. The input signal is modeled as:

$$X(l,k) = Y(l,k) + R(l,k) + \upsilon(l,k) \tag{1}$$

$$R(l,k) = \sum_{l'=0}^{L_k-1} X(l-D-l',k)g(l',k)$$

D≥0→+D is a delay to prevent whitening the processed speech g(l,k)→prediction filter where Y(l,k) is the early reflection of the source which is the desired signal, R(l,k) and υ(l,k) are the late reverberation component and the noise component of the input signal, respectively. In the equations, above, the late reverberation is estimated linearly by the prediction filter g(l,k) at l-th frame with length of $L_k$ for each frequency band. The value D is the delay to prevent the processed speech from being excessively whitened while it leaves the early reflection distortion in the processed speech. The above model uses a fixed prediction filter which is effective for many applications especially when the RIR changes. In the present embodiment, spectral subtraction is used to estimate the enhanced speech signal. To this end, the magnitude of R(l,k) (|R(l,k)|) is estimated and used to build a spectral function for late reverberation reduction. Embodiments for estimating |R(l,k)| and then the spectral gain function are discussed below.

Figure 3:
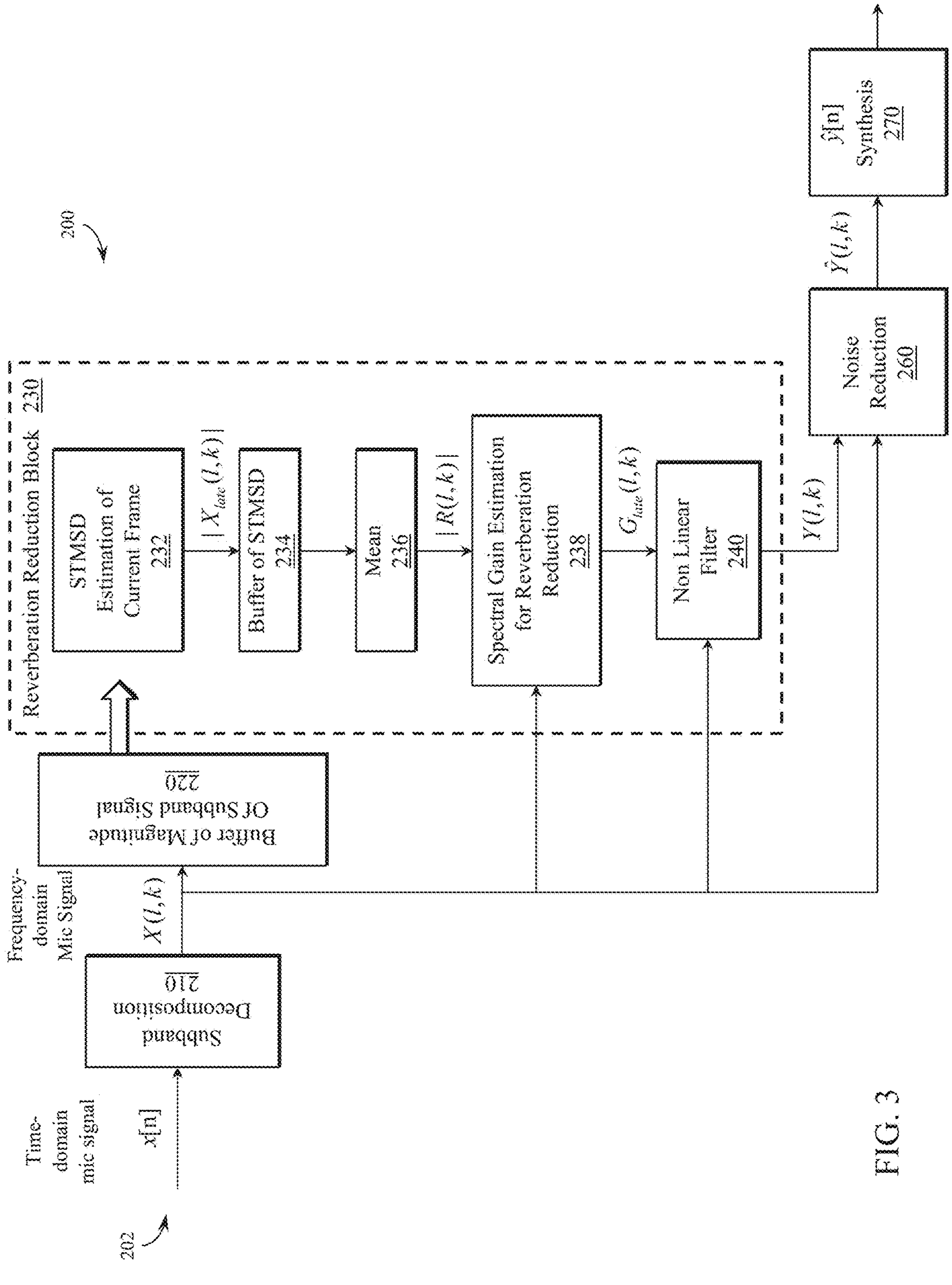
FIG. 3 is a block diagram of an audio processing system including speech deverberation in accordance with an embodiment of the present invention.

Referring to FIG. 3, the subband frames, X(l,k), are provided as input to the buffer 220, which stores the magnitudes of subband signals. The buffer stores the last $L_k$ frames of the magnitude of the subband signals (the length of the buffer and number of past frames stored may be a function of the frequency). The subband frames, X(l,k), are also provided to modules of the reverberation reduction block 230 and noise reduction module 260.

Figure 4:
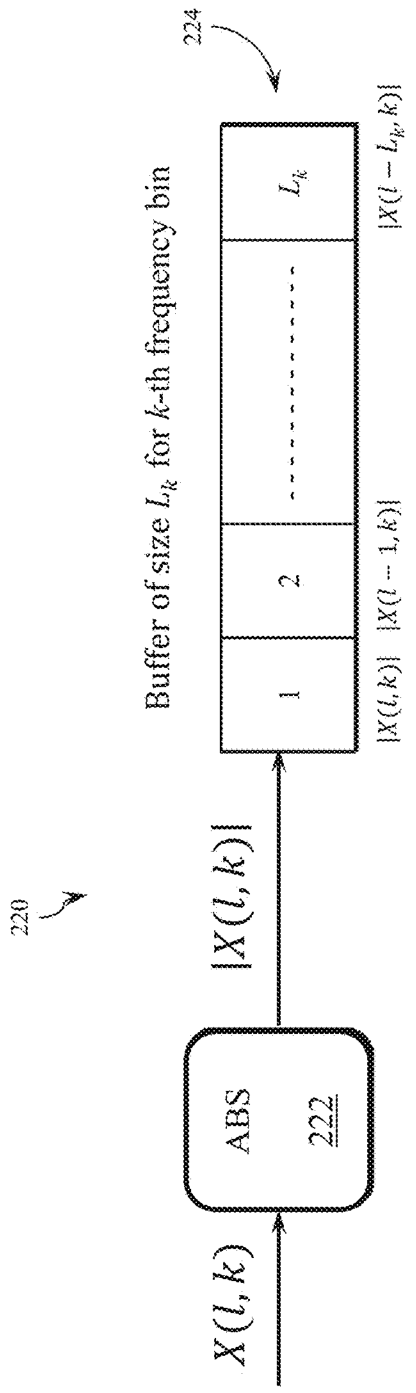
FIG. 4 illustrates a buffer in accordance with an embodiment of the present invention.

An embodiment of the buffer 220 is illustrated in FIG. 4. The buffer 220 includes an absolute value (ABS) block 222 and a memory buffer 224. The input signal for the microphone after the subband decomposition, X(l,k), is fed to the ABS block 222 to compute the magnitude of the signal in the frequency domain which are provided as real-values to the memory buffer 224. This is shown below for frame 1 and frequency bin k. The buffer size for the k-th frequency bin is $L_k$. As illustrated, the most recent $L_k$ frames of the signal are kept in memory buffer 224 for each frequency bin k.

Referring back to FIG. 3, the reverberation reduction block 230 reduces the reverberation signals received at the microphone. The reverberation reduction block 230 receives the buffered subband signal magnitudes from the buffer 220 in a module 232 that estimates the short time magnitude spectral density (STMSD) of the late reverberation component for the current frame. The STMSD of the late reverberation ($|X_{late}(l,k)|$) is related to the magnitude of R(l,k) (|R(l,k)|). This relationship is shown below:

$$|R(l,k)| = \sum_{l'=0}^{T_k-1} |X_{late}(l-l',k)| \tag{2}$$

The estimation of $|X_{late}(l,k)|$ includes the use of a prediction filter, an embodiment of which is discussed below. This estimation is used to estimate the magnitude of the late reverberation component (|R(l,k)|).

It is known that the prediction filter may be estimated by minimizing a cost function. However, such estimation often assumes a static condition where there is no discernible change in the RIR. These adaptive methods are not suitable in time-varying environments where the RIR is assumed to change. To solve this problem, the present embodiment uses a fixed prediction filter having reasonably matched characteristic as the RIR. As illustrated in FIG. 1, a RIR typically has an exponentially decaying characteristic. Also, it is recognized that a Rayleigh distribution may provide a reasonably good performance for speech dereverberation since this smoothing function resembles the shape of reverberation tail in a RIR.

In one embodiment, the prediction filter is obtained using a Rayleigh distribution having three tunable parameters ($b_k$, $L_k$, η):

$$w(l',k) = \frac{l'}{b_k^2} e^{\left(\frac{-l'^2}{2b_k^2}\right)} \quad l' = 0, \ldots, L_k \tag{3}$$

$$g(l',k) = \frac{\eta w(l',k)}{\sum_{l'=0}^{L_k} w(l',k)}$$

where $b_k$ is the Rayleigh parameter which controls the overall spread of this function and $L_k$ is the length of Rayleigh distribution. These values depend on the frame shift of the filterbank. Both $b_k$ and $L_k$ can be dependent on the frequency, but in the present embodiment, equal values are used for all the frequency bins (here we used $b_k{=}^{8}$ and $L_k$=35 for frame shift of 4 ms). The value η is a scale factor denoting the relative strength of the late impulse component and in the present embodiment depends on the amount of reverberation which is related to Direct to Reverberation Ratio (DRR) and the reverberation time of the RIR. For many applications, a fixed value (e.g. 0.28) will provide reasonably good performance. As discussed below with reference to the mean block 236, g(l',k) is not the actual prediction filter but it will be used to obtain the final prediction filter, $G(l,k)_5$ which can better match with the shape of a RIR.

An embodiment of the estimation of the STMSD of the late reverberation component estimation will now be described. As discussed above, the prediction filter g(l',k) is obtained using (3) and then used to estimate the STMSD of the late reverberation component $|X_{late}(l,k)|$ as given below:

$$|X_{late}(l,k)| = \sum_{l'=0}^{L_k-1} |X(l-l'-D,k)| g(l',k) \tag{4}$$

where D=0 is used and |X(l−l'−D,k)| is the magnitude of input signal which was stored in the buffer.

Figure 5:
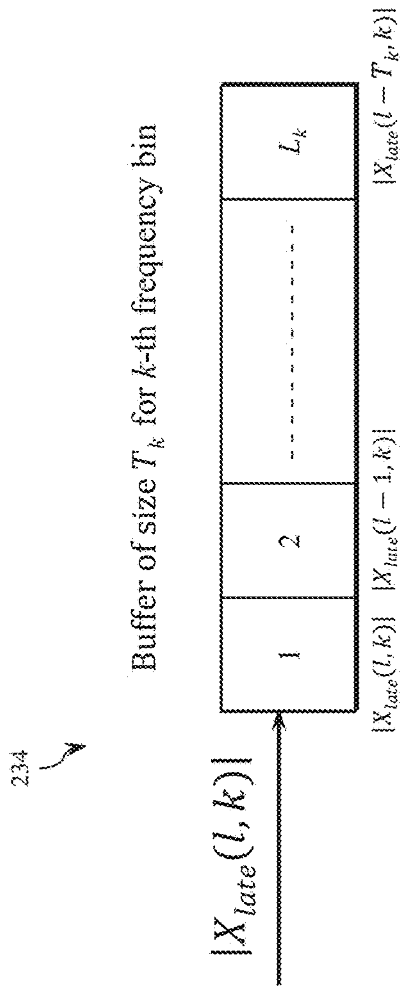
FIG. 5 illustrates an embodiment of a buffer of short time magnitude spectral densities.

The STMSD values for the past $T_k$ frames output from module 232 are stored in a real-value buffer 234. An embodiment of the STMSD buffer 234 is illustrated in FIG. 5. As illustrated, the STMSD buffer 234 of the real-values has a size of $T_k$ for frame 1 and frequency bin k. In various embodiments, $T_k$ is dependent on the frequency and for lower frequencies may be larger than higher frequencies. In the present embodiment, the buffer memory has the same size for all frequency bins. The value of $T_k$ may depend on reverberation time, but in practice using a fixed value (e.g., 15) will lead to a reasonably good result in most practical conditions.

Referring to FIG. 3, a mean block 236 calculates the average of values of the STMSD buffer 234. In this block, the average values the buffer is calculated as given in (2), above. The equations in (2) can be rewritten using (4) as:

$$G(l,k)=\sum_{j=0}^{T_k-1} g(l-j,k),\ l=0,\ \dots\ ,L_k+T_k-1 \tag{5}$$

$$|R(l,k)|=\sum_{l'=0}^{L_k+T_k-1} G(l',k)|X(l-l',k)|$$

As shown in (5), the actual prediction applied to STMSD of the input signal |X(l−l',k)| is G(l,k). The shape of this final prediction filter has an asymmetric shape which is between Gaussian and Rayleigh. In this embodiment, G(l,k) has a peak and goes down more sharply on the left side while the right side of this smoothing function goes down more slowly, which can better estimate the shape of the reverberation tail in an impulse response.

In an alternate embodiment, equation (5) is used to directly estimate |R(l,k)|. In this embodiment, the buffer 220 preferably has a bigger size equal to $L_k+T_k$, which is the same as adding the size of buffers 220 and 234. However, computational complexity using (5) is higher, having $K\times T_k$ more multiplications compared with the system of FIG. 3.

Next, a spectral gain estimation block 238 receives the frequency domain microphone signal X(l,k) from subband decomposition module 210 and the mean values from mean block 236, and estimates the spectral gain, $G_{late}(l,k)$, to reduce the reverberation.

An embodiment for estimating the spectral gain using the STMSD of the late reverberation component will now be described. The spectral gain can be estimated as follows:

$$G_{late}(l,k)=\max(\mathrm{real}(1-(V(l,k))^{\rho(l,k)}),\ G_{floor}) \tag{6}$$

$$V(l,k)=\frac{|R(l,k)|}{|X(l,k)|}$$

where $G_{floor}$ is the spectral floor gain to avoid the enhanced magnitude to be zero or negative value due to overestimation of the STMSD of the late reverberation and it is set to 0.0316. The parameter ρ(l,k) can be fixed for all frames and frequency bins at a nominal value of 0.5. Increasing this parameter can further reduce the late reverberation, but it can also introduce undesirable distortion. This distortion is related to the Signal to Reverberation Ratio (SRR) of the speech frame, and can be increased in low SRR regions that are mainly reverberation, but kept small when the frame is mainly speech (high SRR). In various embodiments, this parameter may be related to the SRR of the speech frames.

In S. Mosayyebpour, M. Esmaeili, and T. A. Gulliver, "Single-microphone early and late reverberation suppression in noisy speech," IEEE Trans. Audio, Speech, Lang. Process., vol. 21, no. 2, 322-335, February 2013, which is hereby incorporated by reference in its entirety, a simple method is suggested in which the enhanced speech signal is first obtained with a fixed value of ρ(l,k)=0.5 and then the enhanced signal is used to obtain the SRR of each frame using the decision directed method. This method has high computational complexity due to the two-step computation of spectral gain and may introduce undesirable distortion.

In the present disclosure, embodiments of an algorithm with relatively low computational complexity are disclosed to effectively estimate P(l,k) for each frame. Despite its low computational complexity, these methods can better improve the performance of ASR by reducing the late reverberation. In one embodiment, the SRR of each frame is computed based on the estimated STMSD of the late reverberation and the magnitude of the received speech signal. To do so, the Magnitude Spectral Density (MSD) of the late reverberation and received signal are computed as follows:

$$MSD_{late}(l)=\sum_{k=0}^{K-1}|R(l,k)| \tag{7}$$

$$MSD_{signal}(l)=\sum_{k=0}^{K-1}|X(l,k)|$$

The SRR for estimation of ρ(l,k) is computed as:

$$SRR_{\rho}(l)=\frac{(MSD_{signal}(l))^2}{MSD_{late}+\varepsilon} \tag{8}$$

where ε is a very small value (e.g., 2.22e-16) to avoid infinity. Then this SRR is used to smoothly estimate ρ(l,k) using the sigmoid function as:

$$q(l)=\frac{1}{1+e^{-max(SRR\rho(l),0)}} \tag{9}$$

$$\rho(l,k)=\min\left(\max\left(1-\frac{q(l)}{2.6},\ \rho_{min}\right),\ \rho_{max}\right),\ k=0,1,2,\ \dots\ ,K-1$$

where $\rho_{min}$ and $\rho_{max}$ are the minimum and maximum of ρ(l,k) and it is set to 0.6 and 0.9, respectively. To further improve the performance of the late reverberation reduction, a new algorithm is developed in which the spectral floor of the spectral grain is not a fixed value and instead it depends on the SRR for each frame. In this embodiment, the spectral gain estimation for reverberation reduction is modified as:

$$G_{late}(l,k)= \tag{10}$$

$$\begin{cases} \max\left(G_{floor},\ \mathrm{real}\left(\min\left(0.1\sqrt{V(l,k)},\ 1\right)^{0.45}\right)\right) & V(l,k)<\max(\min(v(l)-v_0,\ V_{max}),\ V_{min}) \\ \max(G_{floor},\ Z(l,k)) & \text{otherwise} \end{cases}$$

$$Z(l,k)=\mathrm{real}\left(1-\left(\frac{|R(l,k)|}{|X(l,k)|}\right)^{\rho(l,k)}\right)$$

where $v_0$, $V_{max}$, and $V_{min}$ are set to 0.1, 0.9 and 0.32, respectively. In this embodiment, the value v(l) depends on the SRR and is computed using the following:

$$v(l)=\frac{1}{1+e^{-max(SRR_v(l)-0.1,-10)}} \tag{11}$$

$$SRR_v(l)=\frac{(MSD_{signal}(l))^{1.5}}{MSD_{late}+\varepsilon}$$

After estimating the spectral gain as discussed above, the reverberation is reduced by applying the non-linear filter 240 as given below:

$$Y(l,k)=X(l,k)G_{late}(l,k) \quad (12)$$

After reducing the effect of reverberation, in particular the late reverberation, the additive background noise can be removed using a single-microphone noise reduction method. The embodiments disclosed herein can be combined with many types of noise reduction methods especially those which perform noise reduction in the frequency domain.

In one embodiment, the single-channel noise reduction system 200 reduces the background noise in the frequency domain through noise reduction block 260. A noise reduction method using a spectral subtraction approach similar to what is discussed above may be used. For example, a spectral noise-reduction gain ($G_{noise}(l,k)$) gain may be estimated, and then applied using nonlinear filtering to reduce the effect of noise as:

$$\hat{Y}(l,k)=Y(l,k)G_{noise}(l,k) \quad (13)$$

Figure 6:
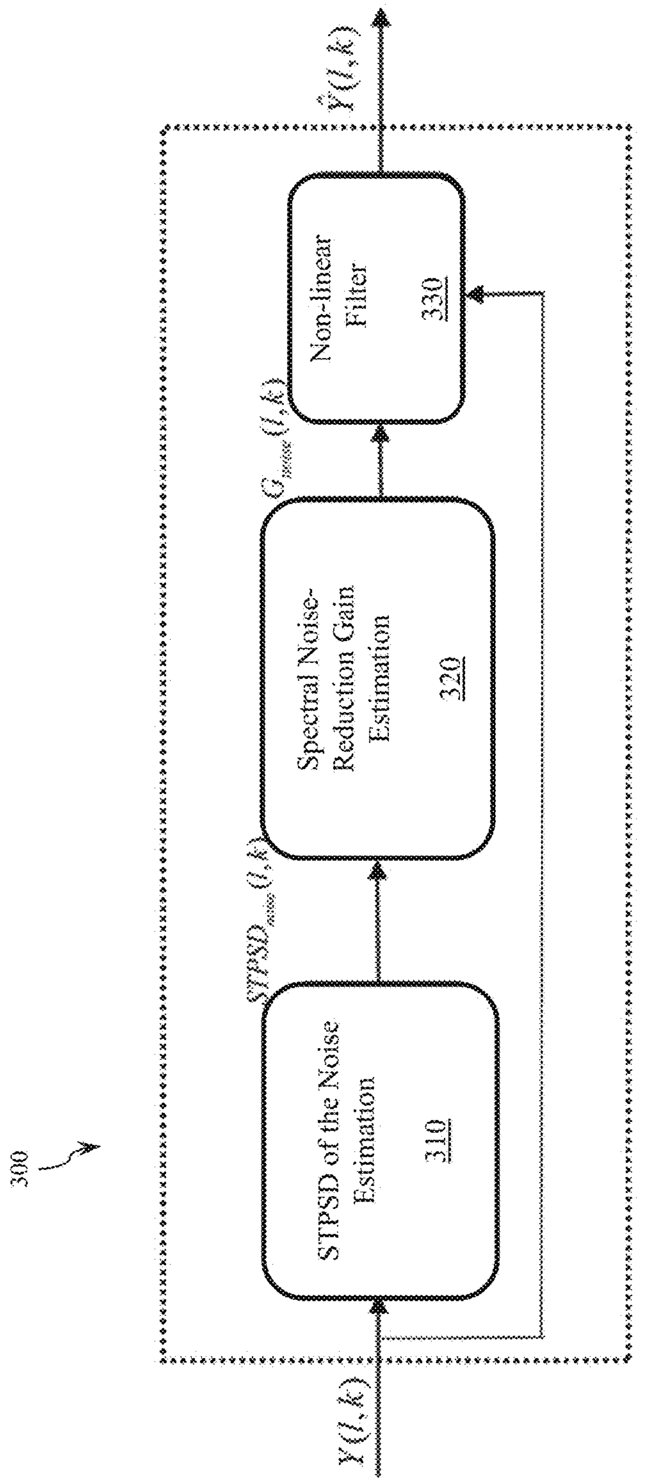
FIG. 6 is a block diagram of a noise reduction block in accordance with an embodiment of the present invention.

To obtain the noise-reduction gain $G_{noise}(l,k)$, the Short Time Power Spectral Density (STPSD) of noise $STPSD_{noise}(l,k)$ is estimated. Below we will briefly discuss a noise reduction embodiment which can be combined with the reverberation reduction system to perform speech enhancement as disclosed herein. An embodiment of the noise reduction block 260 is illustrated in FIG. 6. As illustrated, a noise reduction system 300 reduces the effect of background noise.

In various embodiments, the STPSD of the noise is first estimated at module 310 using a minimum statistic approach and unbiased minimum mean squared error (MMSE) algorithm. One embodiment uses the minimum statistic approach as described in R. Martin, "Noise power spectral density estimation based on optimal smoothing and minimum statistics," IEEE Transactions on Speech and Audio Processing, vol. 9, no. 5, pp. 504-512, July 2001, and the unbiased minimum mean squared error algorithm as described in T. Gerkmann and R. C. Hendriks, "Noise power estimation based on the probability of speech presence," in IEEE Workshop Appl. Signal Process. Audio, Acoust., New Paltz, N.Y., USA, October 2011, pp. 145-148, each of which is hereby incorporated by reference in its entirety. The method based on unbiased MMSE algorithm has lower computational complexity and it is effective for many real time applications such as teleconferencing. However, minimum statistic-based estimation is more suitable for ASR applications in high noise conditions. An embodiment of the STPSD estimation method based on MMSE is discussed below.

To estimate the STPSD in real-time, the STPSD of the noise is initialized as follows:

$$STPSD_{noise}(0,k)=\frac{1}{N}\sum_{l=0}^{N-1}|X(l,k)|^2 \quad (14)$$

where N is set to 1-5 frames assuming that the first N frames of the signal contain only the noise. The STPSD of the noise is updated at each frame using the a posteriori speech presence probability ($\sigma(l,k)$) and is smoothed using the exponential moving average with a smoothing factor $\alpha=0.8$. The updated noise STPSD is then:

$$STPSD_{noise}(l,k)=\alpha\{\sigma(l,k)STPSD_{noise}(l-1,k)+(l-\sigma(l,k))|X(l,k)|^2\}+(1-\alpha)\{STPSD_{noise}(l-1,k)\} \quad (15)$$

where $\sigma(l,k)$ is calculated in each frame using the a posteriori Signal to Noise Ratio (SNR) obtained using the noise STPSD of the previous frame:

$$SRN_{pos}(l,k)=\frac{|X(l,k)|^2}{STPSD_{noise}(l-1,k)} \quad (16)$$

The a posteriori speech presence probability ($\sigma(l,k)$) update rule for each frame is:

$$\sigma(l,k)=\min\left\{\frac{\delta(l,k)}{1+\delta(l,k)},\sigma_{max}\right\} \quad (17)$$

$$\delta(l,k)=\exp(\min\{-3.485+0.9693\ SNR_{pos}(l,k),200\})$$

where $\sigma_{max}$ is the maximum a posteriori speech presence probability (here set to 0.99).

Similar to spectral gain for reverberation reduction, the proposed spectral gain for noise reduction (module 320) can be estimated as:

$$G_{noise}(l,k)=\max(\min((1-F(l,k))^{\rho_n(l,k)},G_{max}),G_{min}) \quad (18)$$

$$F(l,k)=\sqrt{\frac{STPSD_{noise}(l,k)}{|X(l,k)|^2+\varepsilon_F}}$$

where $G_{max}$ and $G_{min}$ are the maximum and minimum value of the spectral gain which is set to 1 and 0.1516, respectively. This will avoid the distortions that may be caused by the overestimation and underestimation of the STPSD of the noise. The value $\varepsilon_F$ is a small value (here set to 1) to avoid an infinity value of F(l,k). Similarly, $\rho_n(l,k)=\rho_n(l)$ is a frequency independent parameter which can control the reduction of noise based on the SNR. The proposed algorithm to estimate this parameter utilizes the STPSD of the noise and the signal as:

$$PSD_{noise}=\sum_{k=0}^{K-1}STPSD_{noise}(l,k) \quad (19)$$

$$PSD_{signal}=\sum_{k=0}^{K-1}|X(l,k)|^2$$

In various embodiments, the algorithm for estimating $\rho_n(l,k)=\rho_n(l)$ using the above PSDs is:

$$SNR_{\rho_n}(l)=\frac{PSD_{signal}}{(PSD_{noise})^{0.8}+\varepsilon} \quad (20)$$

$$q_n(l)=\frac{1}{1+e^{-max(SNR_{\rho_n}(l)-0.1,0)}}$$

$$\rho_n(l)=\min\left(\max\left(1-\frac{q_n(l)}{2.6},\rho_{nmin}\right),\rho_{nmax}\right)$$

where $\rho_{n\ min}$ and $\rho_{n\ max}$ are the minimum and maximum of $\rho_n(l,k)$ and set to 0.6 and 0.9, respectively. The value $\varepsilon$ is a very small value (e.g., 2.22e-16).

After applying nonlinear filtering (module 330), a synthesis module 270 (see FIG. 3) transforms the enhanced subband domain signal to time-domain. In one embodiment, the enhanced speech spectrum for each band will be transform from frequency domain to time domain by applying the overlap-add technique followed by an Inverse Short Time Fast Fourier Transform (ISTFT) as it is commonly done in spectral subtraction-based speech enhancement method.

Figure 7:
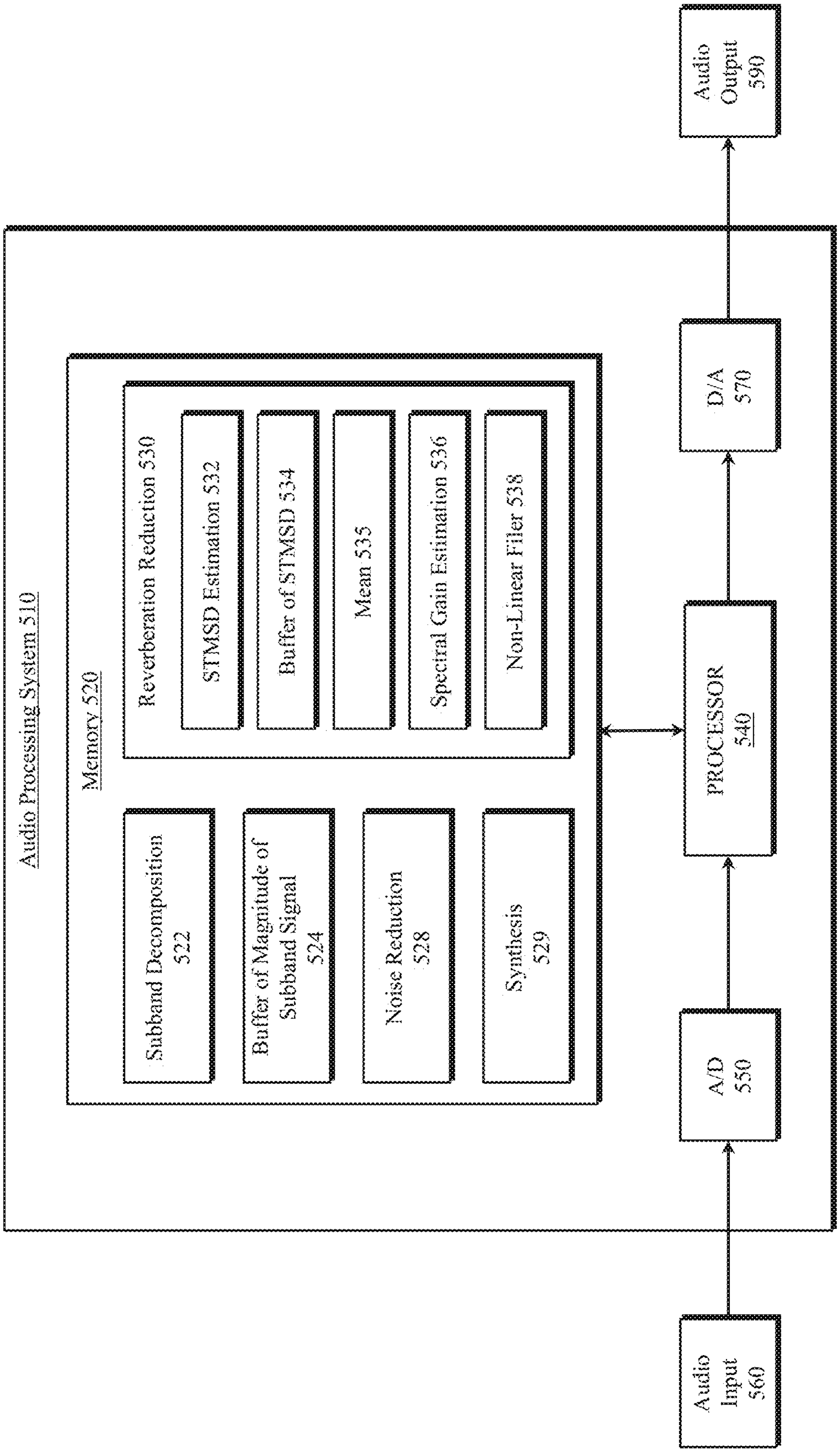
FIG. 7 is a block diagram of an audio processing system in accordance with an embodiment of the present invention.

FIG. 7 is a diagram of an audio processing system for processing audio data in accordance with an exemplary implementation of the present disclosure. Audio processing system 510 generally corresponds to the architecture of FIG. 2, and may share any of the functionality previously described herein. Audio processing system 510 can be implemented in hardware or as a combination of hardware and software, and can be configured for operation on a digital signal processor, a general purpose computer, or other suitable platform.

As shown in FIG. 7, audio processing system 510 includes memory 520 and a processor 540. In addition, audio processing system 510 includes subband decomposition module 522, buffer of magnitude of subband signal module 524, noise reduction module 528, synthesis module 529, and a reverberation reduction module 530, some or all of which may be stored or implemented in the memory 520. The reverberation reduction module 530 may also include an STMSD estimation module 532, a buffer of STMSD module 534, a mean module 535, a spectral gain estimation module 536 and non-linear filter module 538.

Also shown in FIG. 5 are audio input 560, such as a microphone or other audio input, and an analog to digital converter 550. The analog to digital converter 550 is configured to receive the audio input and provide the audio signal to the processor 540 for processing as described herein. In various embodiments, the audio processing system 510 may also include a digital to analog converter 570 and audio output 590, such as one or more loudspeakers.

In some embodiments, processor 540 may execute machine readable instructions (e.g., software, firmware, or other instructions) stored in memory 520. In this regard, processor 540 may perform any of the various operations, processes, and techniques described herein. In other embodiments, processor 540 may be replaced and/or supplemented with dedicated hardware components to perform any desired combination of the various techniques described herein. Memory 520 may be implemented as a machine readable medium storing various machine readable instructions and data. For example, in some embodiments, memory 520 may store an operating system, and one or more applications as machine readable instructions that may be read and executed by processor 540 to perform the various techniques described herein. In some embodiments, memory 520 may be implemented as non-volatile memory (e.g., flash memory, hard drive, solid state drive, or other non-transitory machine readable mediums), volatile memory, or combinations thereof.

The embodiments disclosed herein provide several advantages. The disclosed embodiments perform well in high reverberation, time-varying environments and can be used for both single and multiple sources. The embodiments disclosed herein are blind method and do not require estimating noise or reverberation parameters such as Direct to Reverberation Ratio (DRR), Signal to Noise Ratio (SNR), and reverberation time. The disclosed methods are memory and computationally efficient, and provide real-time algorithms with no latency, which is ideal for many applications such as teleconferencing and hearing aids.

The foregoing disclosure is not intended to limit the present invention to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize advantages over conventional approaches and that changes may be made in form and detail without departing from the scope of the present disclosure. Thus, the present disclosure is limited only by the claims.

What is claimed is:

1. A method for processing an audio signal in a reverberant environment comprising:

receiving an input signal comprising a time-domain, single-channel audio signal comprising an unknown source signal and a reverberation component;

transforming the input signal to a frequency domain input signal comprising a plurality of k-spaced under-sampled sub-band signals;

reducing a reverberation effect, including late reverberation, in the plurality of k-spaced under-sampled sub-band signals, wherein reducing the reverberation effect comprises:

generating a reverberation prediction filter in real time by blindly processing, with respect to the reverberant environment, the unknown source signal and the reverberation component in the plurality of k-spaced under-sampled sub-band signals, including estimating a short time magnitude spectral density (STMSD) for the late reverberation for a current frame; and applying the reverberation prediction filter to the plurality of k-spaced under-sampled sub-band signals to suppress the reverberation component;

reducing background noise from the plurality of k-spaced under-sampled sub-band signals; and transforming the plurality of k-spaced under-sampled sub-band signals to the time-domain, thereby producing an enhanced output signal.

2. The method of claim 1, wherein reducing the reverberation effect further comprises using spectral subtraction comprising buffering $L_k$ frames of the plurality of k-spaced under-sampled sub-band signals, averaging the STMSD over the $L_k$ frames, and nonlinearly filtering the plurality of k-spaced under-sampled sub-band signals.

3. The method of claim 2, further comprising buffering, in a real-value buffer, for each frequency bin a magnitude of spectral density of the input signal for a previous $L_k$ frames, and wherein the estimating the STMSD comprises accessing the real-value buffer to estimate the STMSD of the late reverberation.

4. The method of claim 2, further comprising:

estimating spectral gain for reverberation reduction using Signal To Reverberation Ratio (SRR) and spectral gain floor to reduce distortion in the enhanced output signal; and applying the estimated spectral gain to reduce the reverberation effect.

5. The method of claim 1, wherein reducing background noise from the plurality of k-spaced under-sampled sub-band signals further comprises using spectral subtraction which comprises estimating short time power spectral density (STPSD) of noise, estimating spectral gain and nonlinearly filtering the plurality of k-spaced under-sampled sub-band signals.

6. The method of claim 5, further comprising: estimating spectral gain for noise reduction using SRR and spectral gain floor to reduce distortion in the enhanced output signal; and applying noise-reduction spectral gain to reduce background noise, wherein estimating the STPSD further comprises estimating in real time the STPSD of noise.

7. A system for processing an audio signal in a reverberant environment comprising:

a microphone configured to receive an input signal comprising a time-domain, single-channel audio signal comprising an unknown source signal and a reverberation component;

a processor; and a memory storing instructions that, when executed by the processor, cause the system to:

transform the input signal to a frequency domain input signal comprising a plurality of k-spaced under-sampled sub-band signals;

reduce a reverberation effect, including late reverberation, in the plurality of k-spaced under-sampled sub-band signals, wherein reducing the reverberation effect comprises:

generating a reverberation prediction filter in real time by blindly processing, with respect to the reverberant environment, the unknown source signal and the reverberation component in the plurality of k-spaced under-sampled sub-band signals, including estimating a short time magnitude spectral density (STMSD) of the late reverberation for a current frame; and applying the reverberation prediction filter to the plurality of k-spaced under-sampled sub-band signals to suppress the reverberation component;

reduce background noise from the plurality of k-spaced under-sampled sub-band signals; and transform the plurality of k-spaced under-sampled sub-band signals to the time-domain, thereby producing an enhanced output signal.

8. The system of claim 7, wherein reducing the reverberation effect further comprises using spectral subtraction comprising buffering $L_k$ frames of the plurality of k-spaced under-sampled sub-band signals, averaging the STMSD over the $L_k$ frames, and nonlinearly filtering the plurality of k-spaced under-sampled sub-band signals.

9. The system of claim 8, further comprising a real-value buffer storing for each frequency bin a magnitude of spectral density of the input signal for a previous $L_k$ frames, wherein estimating the STMSD comprises accessing the real-value buffer to estimate the STMSD of the late reverberation.

10. The system of claim 8, wherein execution of the instruction further causes the system to:

estimate spectral gain for reverberation reduction using Signal To Reverberation Ratio (SRR) and spectral gain floor to reduce distortion in the enhanced output signal; and apply the estimated spectral gain to reduce the reverberation effect.

11. The system of claim 7, wherein reducing background noise from the plurality of k-spaced under-sampled sub-band signals further comprises using spectral subtraction which comprises estimating short time power spectral density (STPSD) of noise, estimating spectral gain and nonlinearly filtering the plurality of k-spaced under-sampled sub-band signals.

12. The system of claim 11, wherein execution of the instructions further causes the system to:

estimate spectral gain for noise reduction using SRR and spectral gain floor to reduce distortion in the enhanced output signal; and apply noise-reduction spectral gain to reduce background noise, wherein the STPSD is estimated by estimating in real time the STPSD of noise.

13. A method for processing an audio signal in a reverberant environment comprising:

receiving a single-channel audio input signal comprising an unknown source signal and a reverberation component representing reflections of a source in the reverberant environment;

generating a reverberation prediction filter by blindly processing, with respect to the reverberant environment, the unknown source signal and the reverberation component of the single-channel input signal in a frequency domain; and applying the reverberation prediction filter to the single-channel input signal to suppress the reverberation component and generate a single-channel audio output signal comprising an enhanced source component.

14. The method of claim 13, wherein an impulse response of the reverberant environment varies over time based, at least in part, on movement of the source; and wherein generating the reverberation prediction filter further comprises adapting the reverberation prediction filter in real-time to the time-varying impulse response of the reverberant environment.

15. The method of claim 14, wherein the single-channel input signal further comprises a noise component and wherein the method further comprises reducing the noise component through spectral subtraction, including estimating and applying a spectral noise-reduction gain using non-linear filtering.

16. The method of claim 13, further comprising:

decomposing the single-channel audio input signal into a plurality of sub-band signals; and synthesizing the plurality of sub-band signals to produce the single-channel audio output signal, wherein generating the reverberation prediction filter and applying the reverberation prediction filter are performed on the plurality of sub-band signals.

17. The method of claim 16, wherein each of the plurality of sub-band signals comprises a k-spaced under-sampled sub-band signal.

18. The method of claim 13, wherein the reverberation component further includes an early reverberation component representing the reflections of the source received within a first period, and a late reverberation component representing the reflections of the source received after the first period; and wherein generating the reverberation prediction filter further comprises estimating the early reverberation component and the late reverberation component, wherein estimating the late reverberation component comprises estimating a short time magnitude spectral density (STMSD) for a current frame, and generating a non-linear filter based on the STMSD estimation to reduce the late reverberation component in the current frame.

19. The method of claim 18, wherein estimating the STMSD of the late reverberation further comprises estimating the reverberation prediction filter using a Rayleigh distribution having tunable parameters.

20. The system of claim 7, wherein an impulse response of the reverberant environment varies over time based, at least in part, on movement of the source and/or the system; and wherein reducing reverberation further comprises adapting the reverberation prediction filter in real-time to the time-varying impulse response of the reverberant environment.

* * * * *